(12) United States Patent
Bernard

(10) Patent No.: US 7,702,438 B2
(45) Date of Patent: *Apr. 20, 2010

(54) EMISSION MONITORING DISPLAY DEVICE

(76) Inventor: Lee Bernard, 11318 Sunfish La., Houston, TX (US) 77067

(*) Notice: Subject to any disclaimer, the term of this patent is extended or adjusted under 35 U.S.C. 154(b) by 830 days.

This patent is subject to a terminal disclaimer.

(21) Appl. No.: 11/429,844

(22) Filed: May 8, 2006

(65) Prior Publication Data
US 2009/0018720 A1  Jan. 15, 2009

Related U.S. Application Data

(63) Continuation of application No. 10/886,418, filed on Jul. 7, 2004, now Pat. No. 7,069,126.

(51) Int. Cl.
*G01M 17/00* (2006.01)
(52) U.S. Cl. .................... 701/34; 701/36; 340/438
(58) Field of Classification Search ............ 701/33–34, 701/29, 36; 340/438; 709/213, 217–218, 709/182–183
See application file for complete search history.

(56) References Cited

U.S. PATENT DOCUMENTS 7,069,126 B2 * 6/2006 Bernard ...................... 701/34

* cited by examiner

*Primary Examiner*—Yonel Beaulieu
(74) *Attorney, Agent, or Firm*—Delphine James

(57) ABSTRACT

The present invention provides an emission monitoring device for a vehicle. The device includes but is not limited to a lightweight housing for operationally encapsulating a processor, memory; a sensor for each vehicle component to be monitored, a display device; and a power supply for power the device. The processor is programmed to monitor each sensor, capture data from each sensor, store the captured data from each sensor in the memory; and display the captured onto the display device. In one embodiment of the present invention the housing is operationally mounted onto the inner gas lid of the vehicle. In an alternative embodiment, the housing is incorporated into the dashboard.

14 Claims, 6 Drawing Sheets

EMISSION MONITORING DISPLAY DEVICE

This is a continuation of patent number: U.S. application Ser. No. 10/886,418 filed Jul. 7, 2004 (now U.S. Pat. No. 7,069,126.

BACKGROUND

This invention relates to devices utilized to monitor air quality in the environment. As the population increases, the use of vehicles will increase thereby creating an increase in air pollution. The Environmental Protection Agency (EPA) has emission guidelines for vehicles that must be met in order for a vehicle to be considered safe. This invention provides a tool to monitor vehicle air emissions, which helps to determine the effect of the vehicle's emissions on air pollution.

SUMMARY

The present invention provides an emission monitoring device for a vehicle. The device comprises a lightweight housing for operationally encapsulating a processor, memory; a sensor for each vehicle component to be monitored, a display device and a power supply for power the device. The processor is programmed to monitor each sensor, capture data from each sensor, store the captured data from each sensor in the memory; and display the captured onto the display device. In one embodiment of the present invention the housing is operationally mounted onto the inner gas lid of the vehicle. In an alternative embodiment, the housing is incorporated into the dashboard. The device further includes a first hand-held device for a consumer and a second hand-held device for law enforcement officials. More details of the structure of the first-hand held device and second hand-held device are disclosed in the patents. Additionally, the patent adds a DWI testing function.

DETAILED SPECIFICATION

Figure 1:
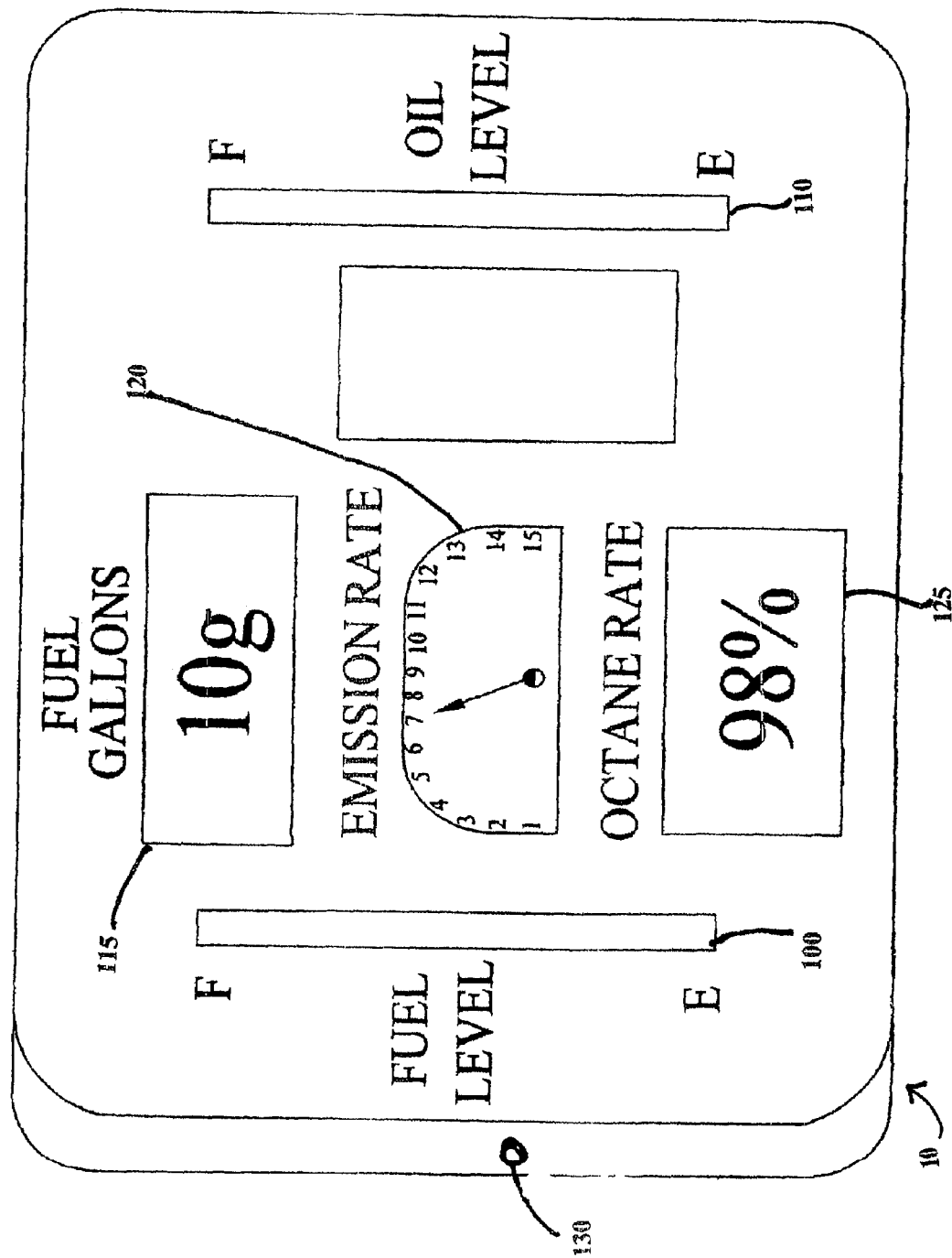
FIG. 1 is a sample display of the present invention.

Referring to FIG. 1, there is shown an illustration of one embodiment of the present invention, an emission monitoring display system (10). As shown, the device can display the following:

Exact fuel level (100)
Exact oil level (110)
Exact number of gallons (115)
Octane rate of gasoline (125)
Exact emission rate (120)
Interface Port (130)

In the preferred embodiment of the present invention, device (10) is dimensioned to be mounted inside the gas lid of the vehicle. In other embodiments, device (10) can be mounted within a vehicle's dashboard. The entire unit is lightweight and weighs between 5-8 ounces.

This embodiment includes an input device for entering data into the system through port (130). The input device can be a touch screen, a voice activated mechanism, and a keyboard input device or another such compatible input device. The display device (10) can be an LCD, an OLED or another such compatible flat or flexible display device.

Figure 1A:
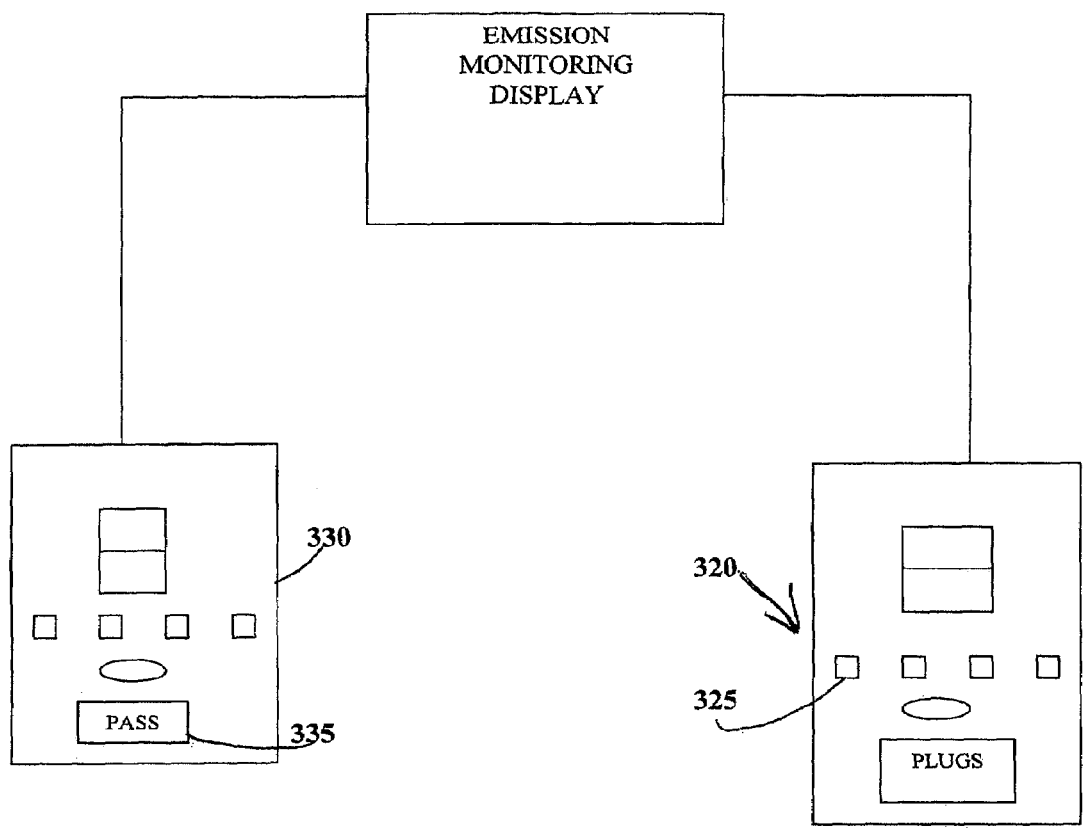
FIG. 1A is illustration of the first and second hand-held devices

As shown in FIG. 1A, the system can include a first hand-held device (320) for the consumer or an automotive repair shop. The first hand-held output device (320) would have a display which indicates the status of several of the sensor leads as described below. For example, if the spark plugs need to be replaced then the device would indicate it through indicator lights (325). In operation, the first hand-held output device (320) would be operationally connected to input port (130) via a hard-wire or a wireless connection. This device 320 would have means for interpreting and translating the diagnostic codes sent by the sensor leads and displaying the diagnostic information to the consumer in a specific language format. The device can have a means for displaying in other languages. Device 10 can further comprise a reset button along with being voice activated.

As shown in FIG. 1A, the system can include a second hand-held device (330) for the law enforcement official. The second hand-held output device (330) would have a display (335) which indicates the status of the emission of the vehicle. For example, the display (335) would indicate pass or fail. Display (335) can be implemented in a color bar or grid. Green can mean pass, yellow can be caution, and red can means fail. In operation, the second hand-held output device (330) would be operationally connected to input port (130) via a hard-wire or a wireless connection. As shown, second hand-held device (330) can further include a device for testing a person for a DWI. This device 331 would connect to the second hand-held device (330). In operation the person would breathe into the device. The device (331) would determine the person blood alcohol level and display the blood alcohol level of the person along with whether the person would pass or failed the test. The device (331) also has the ability to directly communicate with the computer's on-board computer and determine whether device (10) illustrated in FIG. 1 was tampered with. Additionally, first hand-held device and second-hand held device can be adapted with voice activation means.

Figure 2:
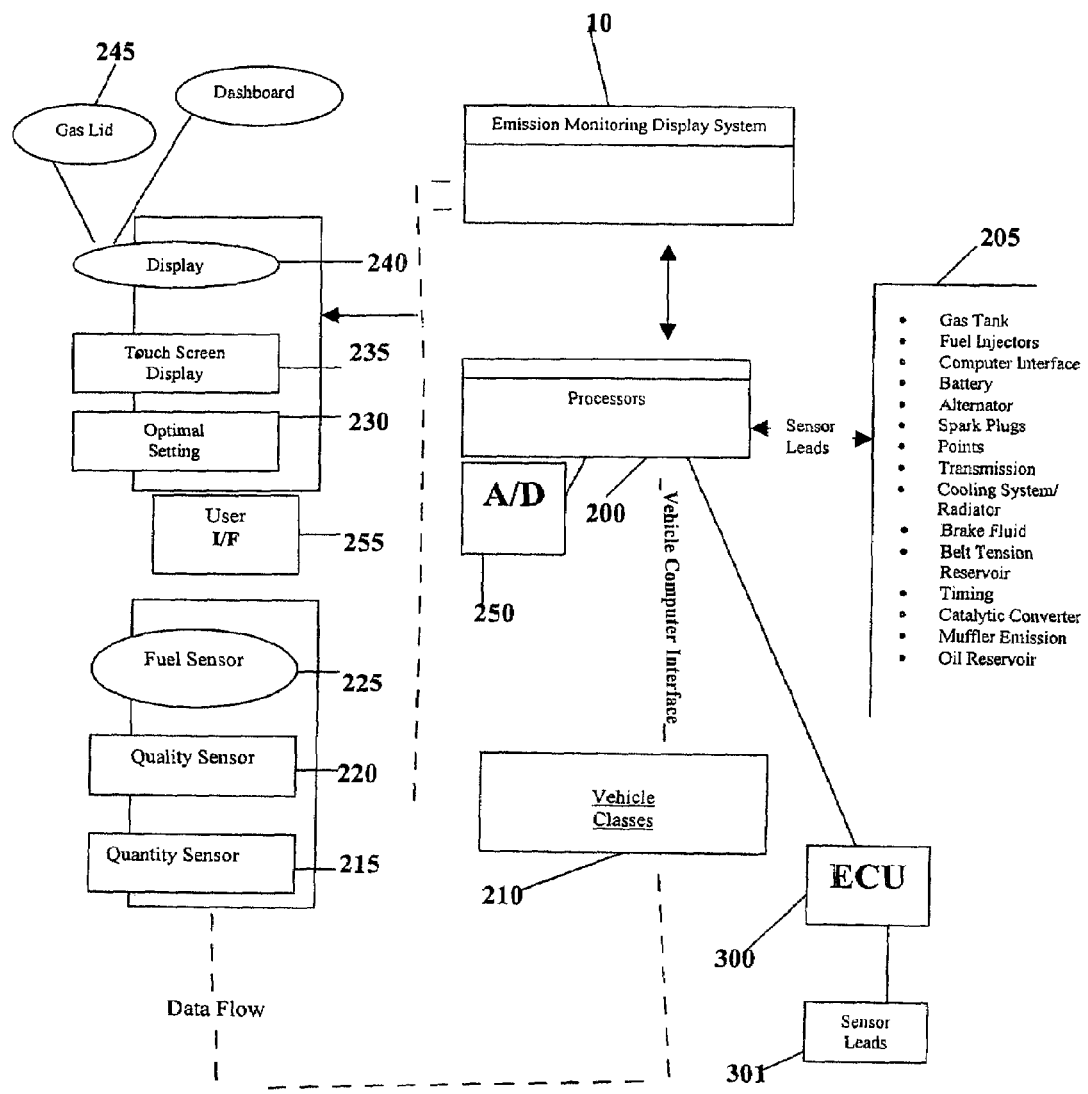
FIG. 2 is an operational diagram of the present invention
Figure 3:
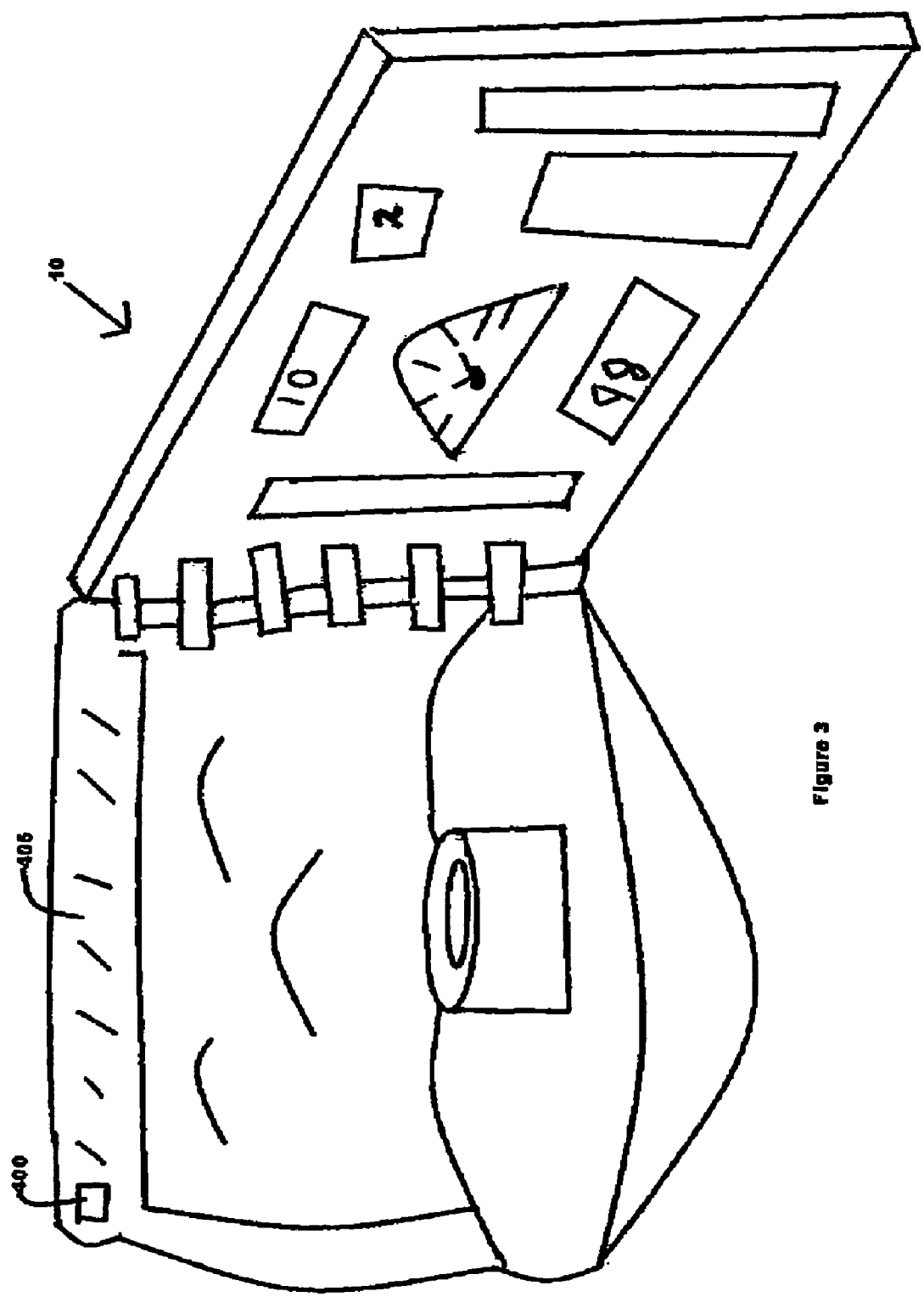
FIG. 3 is a frontal view of the present invention installed in the gas cap.
Figure 4A:
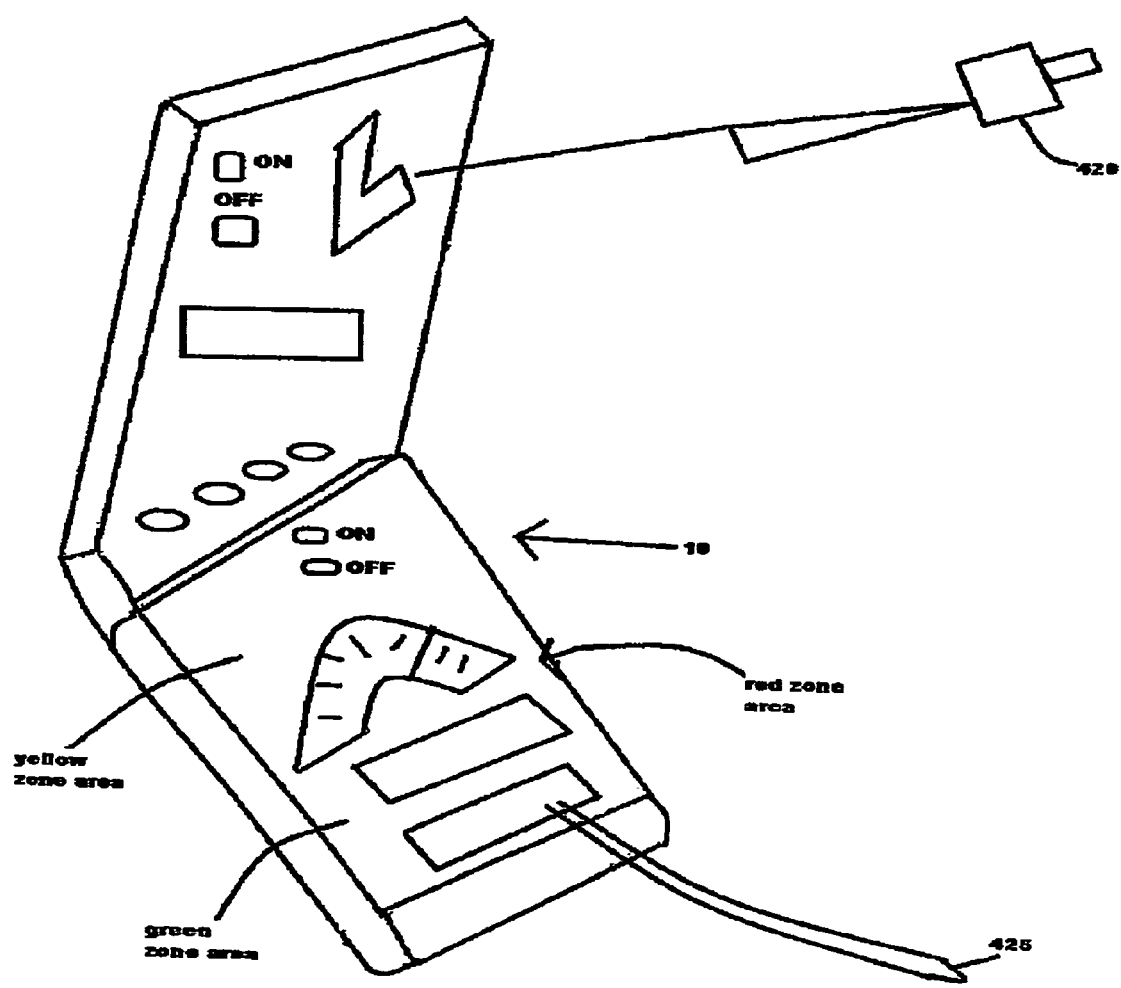
FIG. 4A is a frontal view of the first hand-held device.
Figure 4B:
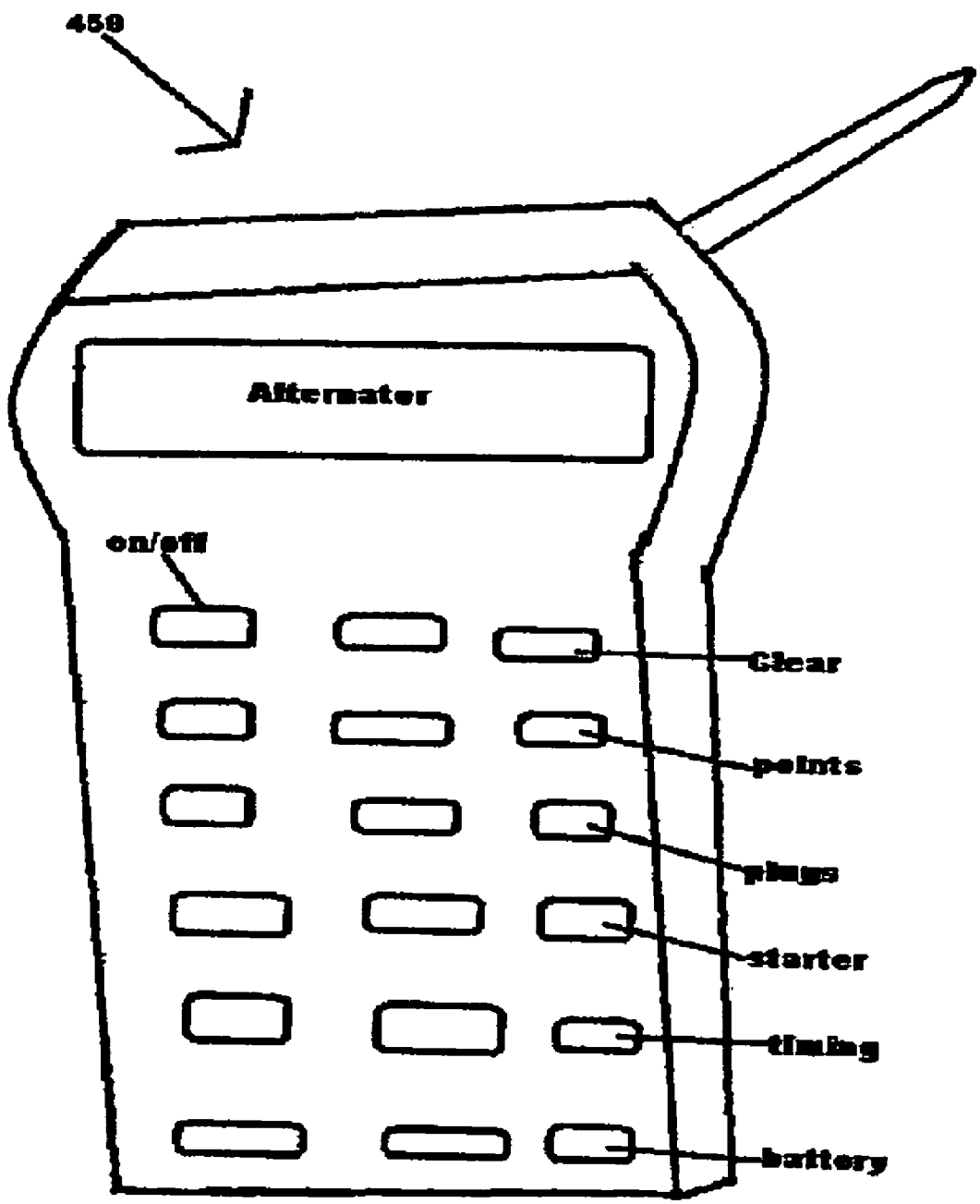
FIG. 4B is a frontal view of the second hand-held device.

Referring to FIG. 2, there is shown an operational block diagram of device (10). The system includes micro-processor (200) connected to a plurality of sensor leads (205). An analog to digital converter (A/D) can be utilized to read analog signals from sensor leads that emit analog signals. The A/D would convert the signals from the sensor leads into digital streams that the microprocessor can read.

The sensor leads can be RIF/A Gallium Sensors or another such compatible sensor lead. In this embodiment, the sensor leads (205) receive information from various vehicle fluid and mechanical components including but not limited to:

| | |
|---|---|
| Oil Reservoir | Points |
| Muffler Emission | Transmission |
| Gas Tank | Cooling System |
| Fuel Injectors | Radiator |
| Computer Interface | Catalytic Converter |
| Battery | Brake Fluid |
| Alternator | Reservoir |
| Spark Plugs | Belt Tension |
| Timing | |

The software program includes vehicle classes (210) which define the data to be stored and the operations to be performed by the software modules that monitor the vehicle fluid and mechanical components. A vehicle object will have to be defined for each type of vehicle to be monitored. The data stored in the objects includes representation of the data received from the sensor leads defined above. The information received includes fuel (225), quality (220) and quantity (215) related sensor data. The sensor leads can report two states (active and dynamic). An active state attributes involve the recording of exposure to negative environments such as wet, dry, heat or vibrations. The dynamic state attributes involve the recording of enhanced performance data.

Additionally, the processor can be interfaced with the existing computer. (300) of the vehicle and where applicable provide a check and balance against the data being analyzed by the system of the present invention. The vehicle computer can also be attached to several leads (305) which provide the data which vehicle computer (300).

User interface software (255) is required to allow the user to setup the device to monitor the vehicle and to the control the monitoring process. In some embodiments, the user interface can be adapted to execute through a separate input device connected to port (130). In other embodiments, user interface software (255) can be setup to execute through a touch screen input device which is operationally incorporated into display (240).

In use, the user via an operational setup screen (235) through the User Interface Software (255) defines the control settings to monitor the air quality of the vehicle through the sensor leads, initiating the system to monitor the vehicle. The setup screen (235) can be a touch screen input device. The processor (200) can periodically poll the sensor leads for information and store the data in the vehicle objects (210). Significant event information can be sent to the processor (200) from the sensor leads (205). Additionally, the dynamic state attributes can allow users from the touch tone to initiate the display of real time data. After information has been transmitted to the processor, the received sensor information is stored in memory for display onto the dashboard (246) or on the gas lid (245). First-hand held device or second hand held device can be adapted to work with device incorporated within dashboard (246).

What is claimed is:

1. An emission monitoring device for a vehicle comprising:
   a lightweight housing for operationally encapsulating: a processor;
   a memory;
   a sensor for each vehicle component to be monitored;
   a display device;
   the processor programmed to: monitor the output from each sensor;
   capture data from each sensor; store the captured data from each sensor into the memory;
   calculate performance attributes based upon the captured data;
   store the performance attributes; display the performance attributes of each vehicle component onto the display device; and
   a system reset button adapted to reset the device and the housing being operationally mounted onto the inner gas lid of the vehicle.

2. The device of claim 1 further comprising a means for activating via voice commands.

3. The device of claim 1 further comprising a communication interface.

4. The device of claim 3 further comprising: a first hand-held output device having a processor and a display indicator for each vehicle component to be displayed; the first hand-held device having a means for removably interfacing with the communication interface; the processor being further programmed to: retrieve from memory the performance attributes for each vehicle component to be display; translate the performance attribute for each sensor; and display the performance attribute onto the display indicator, whereby a user can determine the status of the vehicle component from the indicator; and the output device being operationally connected to the communication interface.

5. The device of claim 3 further comprising: a second hand-held output device having a processor and a display indicator for the vehicle emission; the second hand-held device having a means for removably interfacing with the communication interface and the processor being programmed to: retrieve from memory performance attributes for the vehicle emission; and display the performance attribute onto the display indicator, whereby an operator can determine the whether the car pass status of the vehicle component from the indicator; and the output device being operationally connected to the communication interface.

6. The device of claim 5 wherein the display indicator displays a red for fail, a green for pass, and a yellow for borderline.

7. The device of claim 5 further comprising: the processor being further programmed to: monitor the output from each sensor; capture data from each sensor; store the captured data from each sensor into the memory; calculate performance attributes based upon the captured data; store the performance attributes; and display the performance attributes of each vehicle component onto the display device.

8. The device of claim 4 further comprising a printing device operationally connected to the communication interface.

9. The device of claim 4 further comprising a storage device operationally connected to the communication interface for transferring from memory stored performance attributes and/or captured data for monitored vehicle components.

10. The device of claim 1 further comprising an analog to digital converter for capturing analog data from each sensor producing an analog data.

11. The device of claim 1 further comprising an input device operationally connected to the processor for providing a user interface for initializing each vehicle component to be monitored.

12. The device of claim 1 wherein the vehicle component to be monitored is a detail emission rate for the vehicle.

13. The device of claim 1 wherein the vehicle component to be monitored is the detail fuel level of the vehicle.

14. The device of claim 5 wherein the second hand held device further comprising: a means for determining alcohol blood content of a person; and displaying the blood alcohol content onto the display.

* * * * *